US010152216B2

(12) United States Patent
Kim

(10) Patent No.: US 10,152,216 B2
(45) Date of Patent: Dec. 11, 2018

(54) ELECTRONIC DEVICE AND METHOD FOR CONTROLLING APPLICATIONS IN THE ELECTRONIC DEVICE

(71) Applicant: Samsung Electronics Co., Ltd., Gyeonggi-do (KR)

(72) Inventor: Jaehoon Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 187 days.

(21) Appl. No.: 14/287,808

(22) Filed: May 27, 2014

(65) Prior Publication Data

US 2014/0359504 A1 Dec. 4, 2014

(30) Foreign Application Priority Data

Jun. 4, 2013 (KR) ........................ 10-2013-0064120

(51) Int. Cl.
*G06F 3/14* (2006.01)
*G06F 3/0488* (2013.01)

(52) U.S. Cl.
CPC .. *G06F 3/0488* (2013.01); *G06F 2203/04804* (2013.01); *G06F 2203/04808* (2013.01)

(58) Field of Classification Search
CPC .................................... G06F 3/14; G06F 3/17
USPC ........ 715/768, 769, 835, 273; 345/157, 173, 345/619; 719/328
See application file for complete search history.

(56) References Cited

U.S. PATENT DOCUMENTS

| | | | |
|---|---|---|---|
| 2004/0145574 | A1 | 7/2004 | Xin et al. |
| 2005/0088410 | A1* | 4/2005 | Chaudhri ............ G06F 3/04812 345/157 |
| 2009/0160782 | A1* | 6/2009 | Yang ...................... G06F 3/044 345/173 |
| 2010/0122167 | A1 | 5/2010 | Ryu |
| 2011/0157051 | A1 | 6/2011 | Shohga et al. |
| 2011/0187655 | A1* | 8/2011 | Min ...................... G06F 1/1643 345/173 |
| 2011/0216075 | A1 | 9/2011 | Shigeta et al. |
| 2011/0246329 | A1 | 10/2011 | Geisner et al. |
| 2011/0252423 | A1 | 10/2011 | Freedman et al. |
| 2011/0298724 | A1 | 12/2011 | Ameling et al. |
| 2012/0210270 | A1 | 8/2012 | Kwon et al. |

(Continued)

FOREIGN PATENT DOCUMENTS

| | | |
|---|---|---|
| CN | 102110393 A | 6/2011 |
| CN | 102201099 A | 9/2011 |

(Continued)

OTHER PUBLICATIONS

European Search Report dated Apr. 4, 2017.
Chinese Search Report dated Mar. 2, 2018.

*Primary Examiner* — Ruay L Ho

(74) *Attorney, Agent, or Firm* — Cha & Reiter, LLC

(57) ABSTRACT

An electronic device and a method control applications in the electronic device. A plurality of applications are executed in a foreground and a background. The number of touch points input to a touch screen are detected to select an application according to the detected number of the touch points. A touch gesture is detected for controlling the selected application, and the selected application is controlled according to the detected touch gesture.

21 Claims, 12 Drawing Sheets

(56) References Cited

U.S. PATENT DOCUMENTS

| | | | |
|---|---|---|---|
| 2012/0246565 A1* | 9/2012 | Kumamoto | G06F 8/38 715/273 |
| 2012/0311608 A1 | 12/2012 | Park et al. | |
| 2013/0076659 A1 | 3/2013 | Miyaji | |
| 2014/0089948 A1* | 3/2014 | Li | G06F 9/445 719/328 |
| 2014/0137020 A1* | 5/2014 | Sharma | G06F 3/0486 715/769 |
| 2014/0218392 A1* | 8/2014 | Moore | G09B 29/106 345/619 |
| 2015/0040070 A1* | 2/2015 | Yamano | G06F 3/04886 715/835 |

FOREIGN PATENT DOCUMENTS

| | | |
|---|---|---|
| CN | 102207825 A | 10/2011 |
| EP | 2 395 421 A1 | 12/2011 |
| JP | 2011-186730 A | 9/2011 |

\* cited by examiner

ELECTRONIC DEVICE AND METHOD FOR CONTROLLING APPLICATIONS IN THE ELECTRONIC DEVICE

CLAIM OF PRIORITY

This application claims, pursuant to 35 U.S.C. § 119(a), priority to and the benefit of the earlier filing date of a Korean patent application filed on Jun. 4, 2013 in the Korean Intellectual Property Office and assigned Serial No. 10-2013-0064120, the entire disclosure of which is hereby incorporated by reference.

BACKGROUND

1. Technical Field

This disclosure relates to an electronic device and a method of controlling applications in the electronic device, and more particularly, to an electronic device capable of simply controlling an application operating in a background and a method of controlling applications in the electronic device.

2. Description of the Related Art

An electronic device in the prior art is capable of providing an application execution function. For example, the electronic device in the prior art may provide a page moving function which switches a currently displayed application, that is, an application executed in a foreground of a display screen, to a background to be operated and displayed in the background, and switches an application executed in the background of the display screen to a foreground to be operated and displayed in the foreground upon input of a preset key (e.g., cancel key).

The electronic device according to the prior art can directly control a foreground application but cannot directly control a background application. That is, in order to control an application executed in a background in the electronic device, if an application executed in a foreground is terminated or is executed as a background, and the background application to be controlled is displayed on the display screen, the background application may be directly controlled through an operation with respect to the electronic device in the prior art.

In this manner, in order to control execution of the background application of the electronic device according to the prior art, a plurality of steps must be inconveniently performed.

Accordingly, in the prior art, there is a need for an electronic device capable of simply and rapidly performing an application executed in the background by inputs in a foreground, and controlling, in the foreground, the application executed in the background.

SUMMARY

The present invention solves the above problems, and includes an electronic device capable of simply and rapidly controlling applications executed in a background and confirming pages corresponding to the applications executed in the background from inputs and operations in a foreground, and includes a method of controlling the applications in the electronic device.

In accordance with an aspect of the present invention, the method of controlling applications in the electronic device includes: executing a plurality of applications in a foreground and a background; detecting the number of touch points input to a touch screen to select an application according to the detected number of the touch points; detecting a touch gesture for controlling the selected application; and controlling the selected application according to the detected touch gesture.

In accordance with another aspect of the present invention, the method of controlling applications in the electronic device includes: layering the executed applications in an order in which the applications are recently executed; detecting the number of touch points input on an application execution view or image corresponding to a first layer, and selecting an application corresponding to the detected number of the touch points; displaying an execution view of the selected application in part or on the whole with semi-transparency; detecting a touch gesture for controlling the selected application; and controlling the selected application according to the detected touch gesture.

In accordance with still another aspect of the present invention, the method of controlling applications in the electronic device includes: layering a plurality of applications in a recently executed order; determining whether a plurality of touch points are input on an application execution view corresponding to an upper most layer; displaying a whole execution view of a plurality of background applications on a part of an application execution view corresponding to the upper most layer when the touch points are input on the application execution view; selecting one background application according to the number of the touch points; detecting a touch gesture for controlling the selected background application; and controlling the selected background application according to the detected touch gesture.

In accordance with yet another aspect of the present invention, the electronic device includes: a touch panel detecting a touch point for selecting one of a plurality of executed applications; a controller detecting the number of the touch points to select an application mapped to the detected number of the touch points, and controlling the selected application according to a touch gesture; and a memory storing the applications to be mapped to the number of the touch points in a recently used order, and storing execution commands of a plurality of touch gestures and the applications to be mapped to each other.

BRIEF DESCRIPTION OF THE DRAWINGS

The above features and advantages of the present invention will be more apparent from the following detailed description in conjunction with the accompanying drawings, in which:

FIG. 5, FIG. 6, FIG. 7, FIG. 8, FIG. 9, FIG. 10, FIG. 11 and FIG. 12 are diagrams illustrating a user interface for

DETAILED DESCRIPTION

Figure 1:
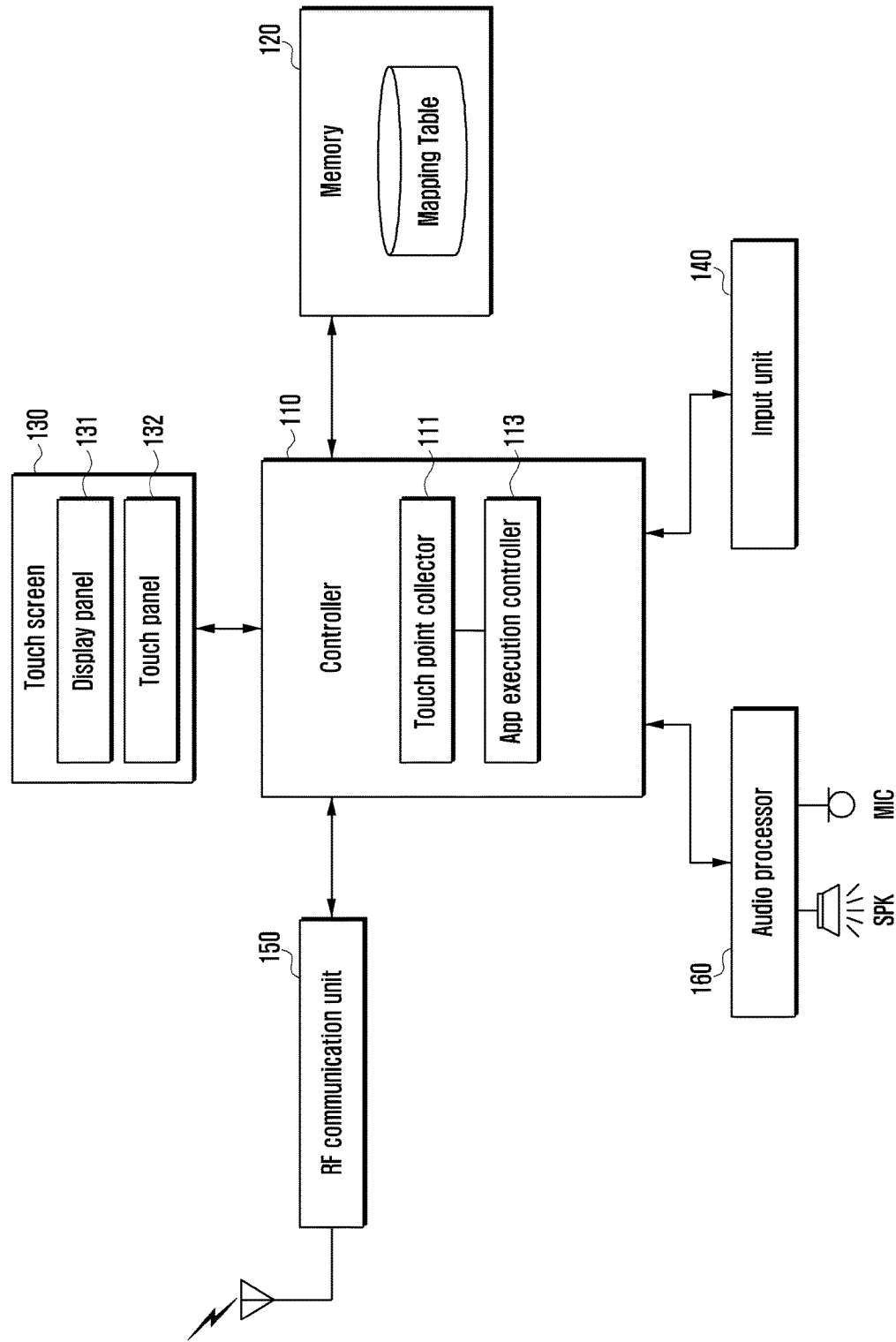
FIG. 1 is a block diagram schematically illustrating a configuration of an electronic device according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

While the present invention has been shown and described with reference to certain exemplary embodiments, it will be understood by those skilled in the art that various changes in form and details may be made therein without departing from the spirit and scope of the present invention as defined by the appended claims. In addition, terms described herein, which are defined with reference to the functions of the present invention, may be implemented differently depending on a user or operator's intention and practice. Therefore, the terms should be understood on the basis of the disclosure throughout the specification. The principles and features of the present invention may be employed in varied and numerous exemplary embodiments without departing from the scope of the present invention.

Furthermore, although the drawings represent exemplary embodiments of the present invention, the drawings are not necessarily to scale and certain features may be exaggerated or omitted in order to more clearly illustrate and explain the present invention.

Among the terms set forth herein, a terminal, a mobile device, a portable device, or an electronic device refers to any kind of device capable of processing data which is transmitted or received to or from any external entity. The terminal, the mobile device, the portable device, or the electronic device may display icons or menus on a screen to which stored data and various executable functions are assigned or mapped. The terminal, the mobile device, the portable device, or the electronic device may include a computer, a notebook, a tablet PC, a cellphone, and any known type of electronic device.

Among the terms set forth herein, a screen refers to a display or other output devices which visually display information to the user, and which optionally may include a touch screen or touch panel capable of receiving and electronically processing tactile inputs from a user using a stylo, a finger of the user, or other techniques for conveying a user selection from the user to the display or to other output devices.

Among the terms set forth herein, an icon refers to a graphical element such as a figure or a symbol displayed on the screen of the electronic device such that a user can easily select a desired function or data. In particular, each icon has a mapping relation with any function being executable in the electronic device or with any data stored in the electronic device and is used for processing functions or selecting data in the electronic device. When a user selects one of the displayed icons, the electronic device identifies a particular function or data associated with the selected icon. Then the electronic device executes the identified function or displays the identified data.

Among the terms set forth herein, data refers to any kind of information processed by the electronic device, including text and/or images received from any external entities, messages transmitted or received, and information created when a specific function is executed by the electronic device.

In the exemplary embodiment of the present invention, the electronic device may include a mobile communication terminal, a smart phone, a tablet PC, a hand-held PC, a portable multimedia player (PMP), a personal digital assistant (PDA), a notebook computer, and an electronic-book terminal. Hereinafter, the electronic device of the present invention is described, for example, for use as a mobile communication terminal.

FIG. 1 is a block diagram schematically illustrating a configuration of the electronic device according to the exemplary embodiment of the present invention. Referring to FIG. 1, the electronic device according to the exemplary embodiment of the present invention includes a controller 110, a memory 120, a touch screen 130, an input unit 140, a radio frequency (RF) communication unit 150, and an audio processor 160.

The input unit 140 may include input keys and function keys for receiving letters, numbers, symbols, or various character information, for setting various functions, and for controlling functions of the electronic device. The function keys may include arrow keys, side keys, and hot keys set to perform a specific function. The input unit may generate a key signal associated with a user setting and function control of the electronic device, and transmit the generated key signal to the controller 110.

In particular, the input unit 140 of the present invention may transmit a signal for selecting a specific background application, a signal for outputting an execution view or image corresponding to the specific background application to a part or the whole of an execution view or image corresponding to a foreground application, a command signal for controlling execution of the specific background application, and a signal for changing the selection of the specific background application to the controller 110.

The input unit 140 may include at least one of a key pad, a ball joystick, an optical joystick, a wheel key, a touch key, a touch pad, the touch screen 130, and a mouse, and a combination thereof. Meanwhile, when the electronic device supports a full touch screen, the input unit 140 may be mounted at a side of a housing of the electronic device, and may include a volume key for controlling a volume of the speaker SPK, and a function key for view on/off or power on/off.

The RF communication unit 150 supports a wireless communication function of the electronic device. When the electronic device supports a mobile communication function, the RF communication unit 150 may be a mobile communication module. The RF communication unit 150 may include at least one of an RF transmitter for up-converting a frequency of a transmitted signal and amplifying the converted signal, an RF receiver for low-noise-amplifying a received signal and down-converting the amplified signal.

Further, when the electronic device of the present invention supports a near field wireless communication function such as a communication function using WI-FI, a wireless technology for data exchange over a computer network, commercially available from the WI-FI ALLIANCE, a communication function using BLUETOOTH, a short range wireless communications technology at the 2.4 GHz band, commercially available from the BLUETOOTH SPECIAL INTEREST GROUP, INC., and a near field communication (NFC) function, the RF communication unit 150 may be a communication module using WI-FI, a wireless technology for data exchange over a computer network, commercially available from the WI-FI ALLIANCE, a communication module using BLUETOOTH, a short range wireless communications technology at the 2.4 GHz band, commercially available from the BLUETOOTH SPECIAL INTEREST GROUP, INC., and an NFC module. In particular, the RF communication unit 150 of the present invention may transmit a connection request for a specific web page and download a web page under the control of the controller 110. The RF communication unit 150 may receive and transmit a character message.

The audio processor 160 may include a sound component for transceiving, encoding, and decoding an audio signal. The audio processor may include a codec and an audio amplifier. The audio processor 160 is connected to a microphone MIC and the speaker SPK. The audio processor 160 generates and transmits data of an audio signal input from the microphone MIC to the controller 110. The audio processor 160 may convert the audio signal into an analog signal and output the analog signal through the speaker SPK. Further, the audio processor 160 may output various audio signals (e.g., MP3 files, an audio signal according to playback of a moving image file, etc.) generated from the electronic device of the present invention through the speaker SPK. In particular, the audio processor 160 of the present invention may output a sound effect indicating selection of a background application, a sound effect starting or terminating control of execution of the background application, a sound effect reporting that there is no background application, a sound effect reporting the number of backgrounds, a sound effect when a touch event, the number of touch points, and a touch gesture are input, and a sound effect reporting an error which may occur with the touch event, the number of touch points, and the touch gesture.

The touch screen 130 may be implemented by any known touch screen and any known type of touch screen, and may perform an input function and a display function. To this end, the touch screen 130 may include a display panel 131 and a touch panel 132. The display panel 131 displays information input by the user and information to be provided to the user as well as various menus of the electronic device. For example, the display panel 131 may provide various views according to the use of the electronic device, for example, a home view, a message creation view, reception and/or transmission character message display views, a web page view, and a call view. The display panel 131 may be a liquid crystal display (LCD), an organic light emitting diode (OLED), and an active matrix organic light emitting diode (AMOLED). In particular, the display panel 131 may display at least one or all of various execution views of a background application to overlap with each other and/or may be hidden or partially hidden, or may be overlapped by an execution view of the foreground application. In this case, the display panel 131 may display the execution view of the background application with partial transparency, such as semi-transparency or a preset transparency. Further, the display panel 131 may switch one background application view, output according to the detected number of touch points, to another background application execution view according to a changed number of touch points, and display the other background application execution view. The display panel 131 may display the background applications in an order as recently used by the user, and display information thereon on an execution view as letters, numbers, characters, and symbols. Further, the display panel 131 may display the background application execution view on at least a part of at least one of an upper portion, a central portion, and a lower portion of a foreground application execution view smaller than the whole view or viewable screen area of the display panel 131, or to overlap with the whole view. Various views displayed on the display panel 131 will be described with reference to FIGS. 5 to 11 below.

The touch panel 132 may be mounted on or in a front surface of the display panel 131, may generate a touch event according to contact of a touch input device, for example, a finger of a user or a stylus, and transfer the generated touch event to the controller 110. The touch panel 132 may recognize a touch through variation of a physical characteristic e.g., a capacitance, a resistance, etc., according to contact of the touch input device, and may transmit a type of touch and touched location information to the controller 110. The touch may include a tap event where the touch is released without motion of the touch after the touch, a double touch event where two tap events are generated within a predetermined time, a long touch event where the touch is maintained for a predetermined time or longer, a multi-touch event where the touch is generated in at least two points, and a touch motion event where a touched location is moved after the touching. Further, the touch motion event may include a scroll event where a touch moves in a straight line in a specific direction after the touching, and a gesture event where a touch is moved to have a defined shape (e.g., circle, triangle) after the touch. The touch panel 132 may be implemented by any known touch panel and any known type of touch panel, and thus a detailed description of the touch panel 132 is omitted.

In particular, the touch panel 132 of the present invention may detect input of a touch event and a touch gesture controlling execution of a background application on a view to which a foreground application execution view is output, and transmit the detection result to the controller 110.

The memory 120 may store user data as well as a program necessary to operate or perform functions of the electronic device according to the exemplary embodiment of the present invention. For example, the memory 120 may store a program for controlling an overall operation of the electronic device, such as an Operating System (OS) for booting the electronic device, an application program necessary for other optional operations or functions of the electronic device, for example, a camera function, an image or moving image playback function, and a near field wireless communication function, as well as a reception function for a character message or a transmission function for character message. Further, the memory 120 may store a key map or a menu map for operating the touch screen 130. The key map or the menu map may be implemented in various forms. For instance, the key map may include a keyboard map, a 3*4 key map, a QWERTY key map, and a control key map for controlling an operation of a currently activated application program. The menu map may include a map of selectable choices displayed on a menu for controlling an operation of a currently activated application program.

In particular, when a touch event for requesting control of execution of a background application in a state that a foreground application execution view is displayed, the memory 120 according to the exemplary embodiment of the present invention may store a background application control program controlling execution of an execution view corresponding to a background application without displaying the an execution view on the touch screen 130. Further, the memory 120 may store an application execution view in a sequential layered order and in the order which the background applications are recently used by the user. For example, the memory 120 may store a plurality of application execution views as a thumbnail image. When control of execution of the background application is requested, the stored thumbnail image is displayed on the display panel 131 to overlap with an execution view of a currently displayed foreground application. Next, the thumbnail image may disappear after a predetermined time or may be displayed for the predetermined time using a flicker effect and disappear.

The memory 120 may store a defined gesture for controlling the background application in the form of a mapping table. The gesture may be classified into various gestures for controlling execution of every application to be set. The gesture may be previously set by a designer or manufacturer of the electronic device upon designing or manufacturer of the electronic device, or may be changed or generated by the user. For example, the memory 120 may sequentially map and store a plurality of background applications in the recently used order by the user from two touch points where the number of touch points for selecting the foreground application is one touch point.

In addition, the memory 120 may store a touch gesture for controlling a specific background application on an execution view of a foreground application to be mapped to specific executions as a command for controlling execution of an application. For example, when the background application corresponds to a mail browser, the memory 120 may store a touch gesture input as characters such as "sending" and "temporary storage" to be mapped to execution of sending a recently input mail to a recorder receiver, and to execution of temporarily storing the recently input mail.

Meanwhile, the various touch gestures may include a command which fully switches a background application with a foreground application.

The controller 110 may control an overall operation of the electronic device and also control the signal flow between internal blocks and components of the electronic device, as well as perform a data processing function processing data. The controller 110 may include a central processing unit (CPU) and an application processor (AP).

In particular, the controller 110 according to the present invention selects a specific background application according to the number of touch events of an input touch event in a state in which a foreground application execution view is displayed. Accordingly, the controller 110 may display a specific background application or an entire background application execution view to overlap with the foreground application execution view or to overlap on a part of the foreground application execution view, and may control execution of the specific background application without displaying the specific background application on the display panel 131. To this end, the controller 110 may include a touch point collector 111 and an app execution controller 113.

The touch point collector 111 may sequentially map and set a plurality of background applications in the recently used order by the user from two touch points where the number of touch points for selecting the foreground application is one point.

For example, the touch point collector 111 may execute 'search web page', "music player", and 'mail browser' as a plurality of applications in the electronic device. Among the plurality of executed applications, the search web page is driven, operated, executed, and/or displayed in the foreground, and the music player and the mail browser may be driven in the background in the order of the music player and the mail browser.

If one touch point is detected, the touch point collector 111 may determine the touch event as a touch event corresponding to the search web page. If two touch points are detected, the touch point collector 111 may determine the touch event as a touch event corresponding to the music player. If three touch points are detected, the touch point collector 111 may determine the touch event as a touch event corresponding to the main browser. Further, if the number of touch points input at an initial operation is changed in the middle of processing touch events, the touch point collector 111 may again detect the changed number of the touch points and detect another background application corresponding to the detected changed number of the touch points.

The app execution controller 113 controls execution of a corresponding application according to a touch gesture input after the touch point collector 111 detects the number of touch points for a touch event.

The touch gesture may include touch, tap, press, drag, drag and drop, flick, and drag and flick, or a combination thereof. The touch is an operation where a user pushes one point of a screen. The tap is an operation where a finger is removed or released from a corresponding point on the touch input unit, that is, the touch panel 132, without movement of the finger after touching one point. The press is an operation where a finger is removed or released from a corresponding point on the touch input unit, that is, the touch panel 132, without movement of the finger after touching it longer than the tap. The drag is an operation that moves a finger in a predetermined direction in a state that one point is touched. The drag and drop is an operation in which a finger is released or removed from the touch input unit, such as the touch panel 132, after the drag. The flick is an operation in which a finger is released or removed from the touch input unit after moving the touch by bouncing the touch at high speed in a manner similar to flipping. Further, the drag and flick is an operation where a flick is performed at any time point after drag, that is, the drag and the flick are continuously achieved in a state that a finger makes contact with the touch screen 130. The controller 110 may distinguish the sweep and the drag from each other based on moving speed.

In particular, the touch gesture may be input while maintaining the number of the touch points on the touch panel 132, or may be input as the number of one touch point after the number of the touch points is input within a predetermined time. For example, the touch gesture may maintain a touch point input by two fingers and may be continuously input by two fingers. The touch gesture may be input by one finger after the user maintains the input of a touch point with a corresponding number for a preset time in order to select a specific application from a plurality of applications. This method is implemented because there may be a limitation to input a touch gesture on a touch screen 130 such as being limited by a plurality of fingers, and the user may feel inconvenient in maintaining the touch gestures for various periods of time.

For example, if a drag input from a left side to a right side of the touch panel 132 by two fingers is continuously detected after the 'music player' is selected as a background application corresponding to two touch points collected by the touch point collector 111, the app execution controller 113 may change a currently played sound source by the 'music player' to a next sound source in a playback order from a list and play the next sound source. The touch gesture is not input on a music player execution view but instead is input on an execution view corresponding to a foreground application, even though the music player is a background application.

Alternatively, if a drag input from a right side to a left side of the touch panel 132 by two fingers is detected, the app execution controller 113 may change a currently played sound source to a previous sound source in a playback order from the list and play the previous sound source. If a drag input from an upper portion to a lower portion of the touch panel 132 by two fingers is detected, a currently played sound source may be paused.

Next, when the user inputs the number of touch points on an execution view of the foreground application using one finger, a search web page may be controlled. If the user inputs the number of the touch points by three fingers, a mail browser may be controlled, even though the mail browser is a background application. The controller 110 will be described in more detail with reference to FIGS. 2 to 11.

Meanwhile, the electronic device may selectively and further include constituent elements having an additional function such as a global positioning system (GPS) module for receiving location information, a broadcasting receiving module for receiving broadcast transmissions, a digital sound source module such as an MP3 source, and an Internet communication module performing an Internet-based function, such as browsing. Since the constituent elements of the electronic device can be variously changed according to convergence trend of a digital device, not all possible elements are exhaustively listed herein. However, the electronic device of the present invention may include any and all known constituent elements for implementing known functions and services.

Figure 2:
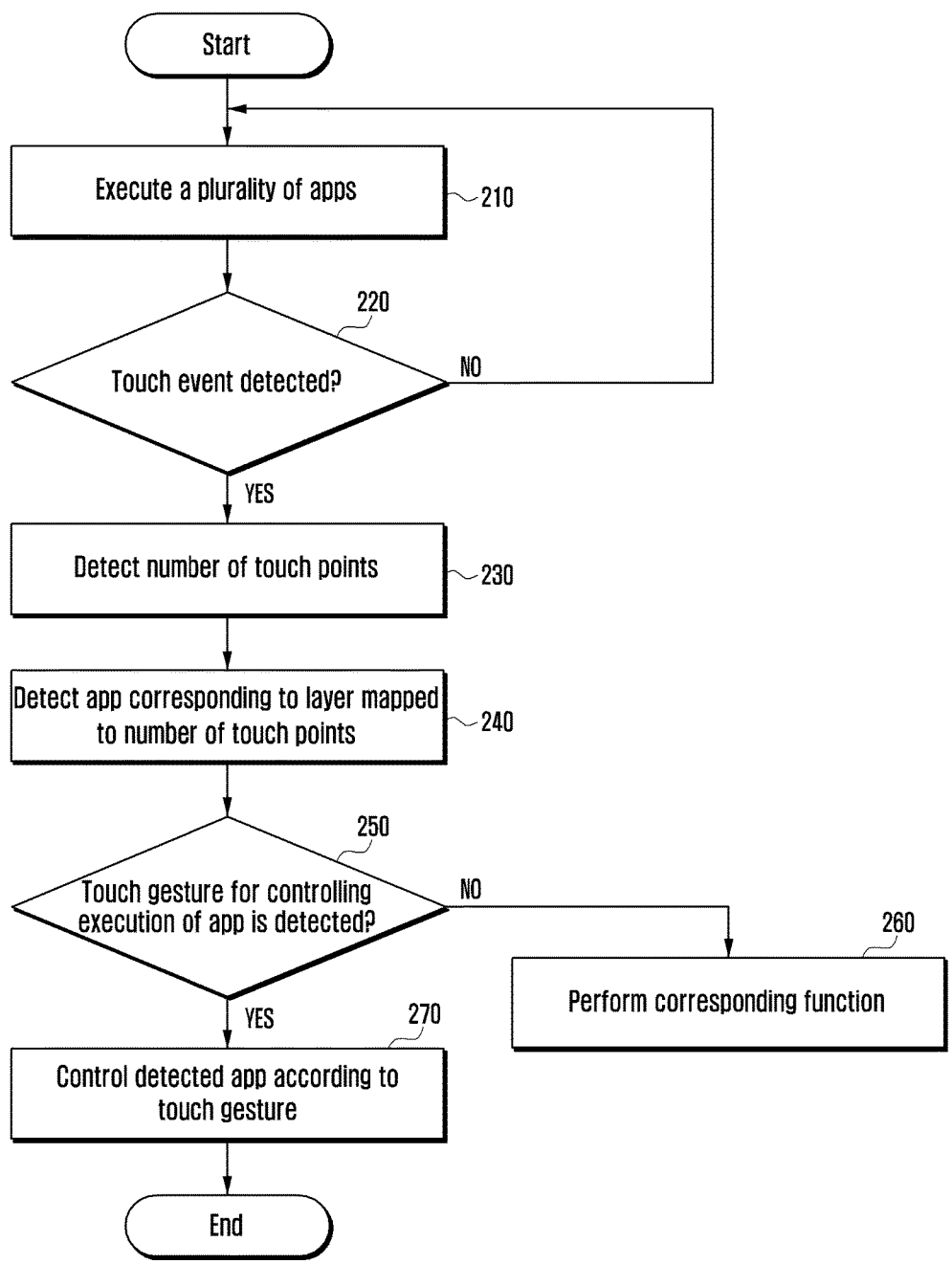
FIG. 2 is a flowchart illustrating a method of controlling applications of the electronic device according to the exemplary embodiment of the present invention.

FIG. 2 is a flowchart illustrating a method of controlling applications of the electronic device according to the exemplary embodiment of the present invention.

Referring to FIG. 2, a controller 110 according to the exemplary embodiment of the present invention executes a plurality of applications in step 210. That is, the controller 110 performs multi-tasking by simultaneously executing the plurality of applications. For example, the latest executed application by the user among the applications is executed in a foreground, and previously executed applications are executed in a background. Accordingly, the controller 110 may layer the applications executed in the foreground and at least one application executed in the background. That is, the user may layer an execution view corresponding to a plurality of applications in the latest executed order.

Next, the controller 110 determines whether a touch event input on the touch screen 130 is detected in step 220. If no touch event is detected in step 220, the method loops back to repeat steps 210-220 until a touch event is input and detected. When the touch event input on the touch screen 130 is detected in step 220, the controller 110 detects the number of touch points based on the touch event in step 230. That is, the number of fingers of the touch event input on the touch screen 130 is detected. In this case, the number of simultaneously input fingers may be detected as the number of touch points.

Next, the controller 110 detects an application or app corresponding to a layer mapped to the number of touch points in step 240. That is, the controller 110 detects an application corresponding to a layer previously mapped to the number of the touch points.

For example, a first layer, that is, an application executed in a foreground, is mapped to one touch point, and applications executed in the background from the second layer are mapped to at least two touch points in an ascending order. For example, the controller 110 may execute 'search web page', 'music player', and 'mail browser' applications as a plurality of applications in the electronic device. Among the applications, the search web page is executed in a foreground, and the music player and the mail browser may be executed in the background in the order of the music player and the mail browser. If two touch points are detected, the controller 110 may detect a 'music player' application driven, operated, or executed on the second layer.

Next, the controller 110 may determine whether a defined touch gesture for controlling execution of an application is detected in step 250. That is, if the number of touch points is detected based on the touch event input to the touch screen 130, the controller 110 may determine whether the touch gesture is detected based on the touch event. In this case, the touch gesture may refer to a command signal input by the user in order to control execution of one application among a plurality of applications. Various touch gestures and application execution commands may be previously mapped and stored.

The touch gesture may include touch, tap, press, drag, drag and drop, flick, and drag and flick, or a combination thereof. The touch is an operation where a user pushes one point of a screen. The tap is an operation where a finger is removed or released from a corresponding point on the touch input unit, such as the touch panel 132, without movement of the finger after touching one point. The press is an operation where a finger is removed or released from a corresponding point on the touch input unit, such as the touch panel 132, without movement of the finger after touching it longer than the tap. The drag is an operation that moves a finger in a predetermined direction in a state that one point is touched. The drag and drop is an operation in which a finger is released or removed from the touch input unit, such as the touch panel 132, after the drag. The flick is an operation in which a finger is released or removed from a touch input unit, such as the touch panel 132, after moving the touch by bouncing the touch at high speed in a manner similar to flipping. Further, the drag and flick is an operation where a flick is performed at any time point after drag, that is, the drag and the flick are continuously achieved in a state that a finger makes contact with the touch screen 130. The controller 110 may distinguish the sweep and the drag from each other based on moving speed.

For example, the user may select a 'music player' application corresponding to a second layer by touching the touch screen 130 using two fingers, and continuously drag the selected 'music player' application from a left side to a right side of the touch panel 132 using the two fingers to change a currently played sound source to a next sound source in the playback order in a list, thereby inputting a playback command, even though the 'music player' application is a background application. Meanwhile, the user may select the 'music player' application and continuously drag the selected 'music player' application from the right side to the left side of the touch panel 132 using the two fingers to change a currently played sound source to a previous sound source in the playback order in a list, thereby inputting a playback command, even though the 'music player' application is a background application. The user may drag the selected 'music player' application from the top to the bottom of the touch panel 132 using the two fingers to input a command for pausing a currently played sound source, even though the 'music player' application is a background application.

Referring back to step 250, if a defined touch gesture for controlling a corresponding application is not detected at step 250, the controller 110 performs a corresponding or different function or other functions of the electronic device which are unrelated to the foreground and background applications, such as turning off the electronic device, in step 260.

For example, although one background application is extracted according to the number of touch points, if the touch gesture is not continuously detected, the touch gesture does not affect execution of a corresponding application.

Referring back to step 250, if a defined touch gesture for controlling a corresponding application is detected in step 250, the controller 110 controls the detected or selected application according to the touch gesture in step 270. That is, the controller 110 may control execution of a corresponding application according to a touch gesture input by the user. In this case, an execution view of an application corresponding to a first layer which is executed in the foreground is displayed on the display panel 131. However, the application executed in the background is not viewed by the user but nevertheless may be controlled by the user. After step 270, the method of FIG. 2 then ends.

As described above, the exemplary embodiment according to the present invention may easily control execution of a plurality of applications executed in a background according to the number of touch points input to the touch screen 130 of the electronic device without being switched to a foreground, thereby improving convenience for the user.

Figure 3:
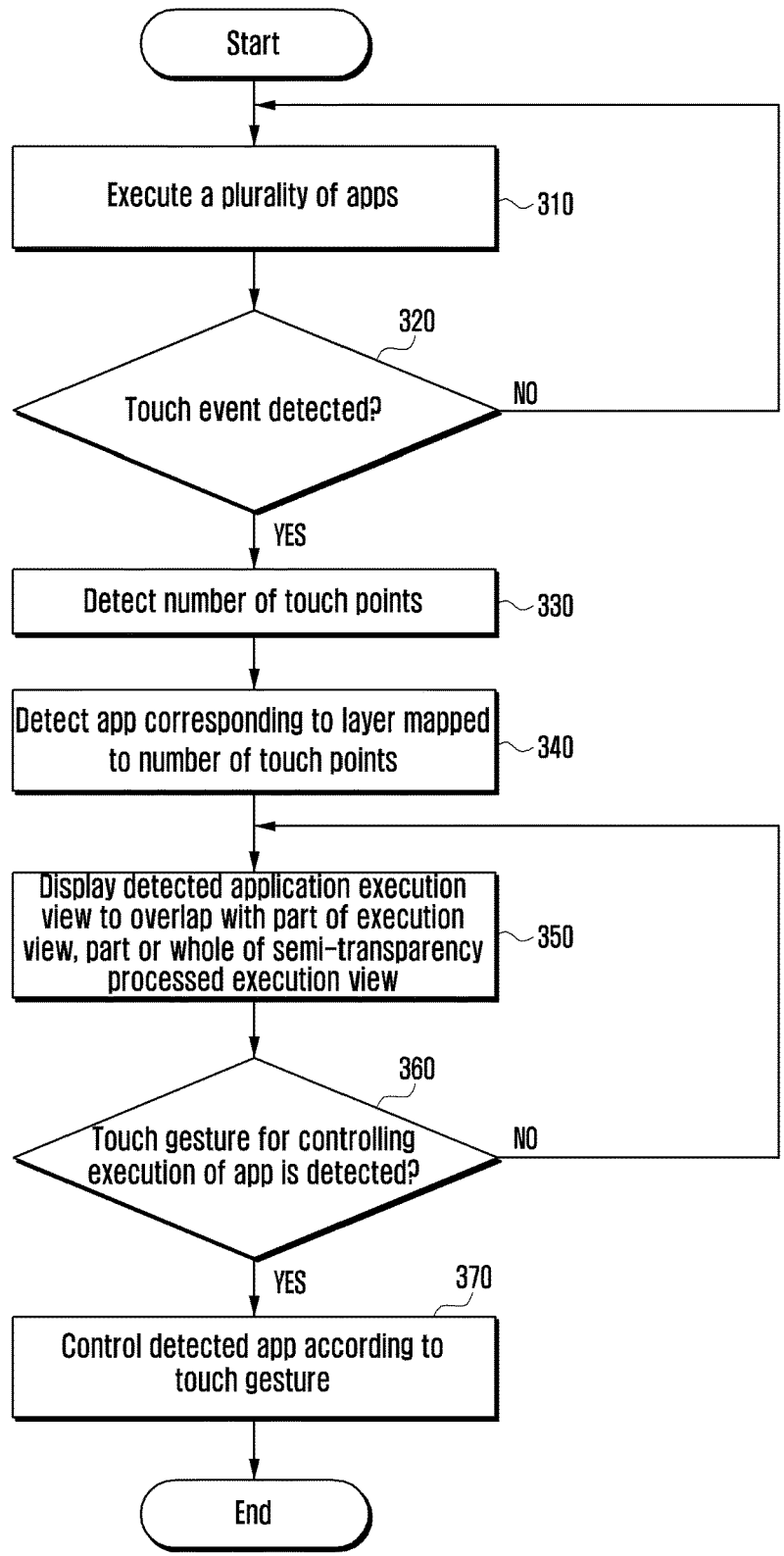
FIG. 3 is a flowchart illustrating a method of controlling execution of applications of the electronic device according to an alternative exemplary embodiment of the present invention.

FIG. 3 is a flowchart illustrating a method of controlling execution of applications of the electronic device according to an alternative exemplary embodiment of the present invention.

Referring to FIG. 3, a controller 110 according to the exemplary embodiment of the present invention executes a plurality of applications in step 310. That is, the controller 110 performs multi-tasking by simultaneously executing the plurality of applications. For example, the latest executed application by the user among the applications is executed in a foreground, and previously executed applications are executed in a background. Accordingly, the controller 110 may layer the applications executed in the foreground and at least one application executed in the background. That is, the user may layer an execution view corresponding to a plurality of applications in the latest executed order. For example, if total of N applications are executed, the user may sequentially layer the applications from the first layer to an N-th layer in the recently used order.

Next, the controller 110 determines whether a touch event input on the touch screen 130 is detected in step 320. If no touch event is detected in step 320, the method loops back to repeat steps 310-320 until a touch event is input and detected. When the touch event input on the touch screen 130 is detected in step 320, the controller 110 detects the number of touch points based on the touch event in step 330. That is, the number of fingers of the touch event input on the touch screen 130 is detected. In this case, the number of simultaneously input fingers may be detected as the number of touch points. The number of the touch points may be set as the number of touches input within a preset time. Alternatively, the number of the touch points may be set as the number of button inputs and/or icon inputs of a stylus pen, a pen, or an electronic device other than touch inputs using the fingers of the user, but the exemplary embodiment of the present invention is not limited thereto.

Next, the controller 110 detects an application or app corresponding to a layer mapped to the number of touch points in step 340. That is, the controller 110 detects an application corresponding to a layer previously mapped to the number of the touch points.

For example, a first layer, that is, an application executed in a foreground, is mapped to one touch point, and applications executed in the background from the second layer are mapped to at least two touch points in an ascending order. For example, the controller 110 may execute 'search web page', 'music player', and 'mail browser' applications as a plurality of applications in the electronic device. Among the applications, the search web page is executed in a foreground, and the music player and the mail browser may be executed in the background in the order of the music player and the mail browser. If two touch points are detected, the controller 110 may detect a 'music player' application driven, operated, or executed on the second layer.

Next, the controller 110 displays the detected or selected application execution view to overlap with a part of an execution view corresponding to an application driven on a current foreground or to overlap with a part or the whole of a partially transparent processed execution view in step 350, which may be semi-transparent.

For example, when two touch points are input by the user, the controller 110 may extract a music player application corresponding thereto and driven as a background application, and display an execution view of the music player on a part of a search web page view driven in the foreground. The execution view of the background application, such as the music player application, may be displayed on at least one of an upper portion, a lower portion, and a central portion of the search web page view, and a display location and size of the execution view of the background application may be previously set by a designer or manufacturer of the electronic device, or by the user. The execution view of the background application, such as the music player, may be displayed to overlap with the whole search web page as a transparent window.

The execution view corresponding to the application driven in the background may be displayed for a predetermined time on the touch screen 130 and then disappear, and may be displayed while flickering a display window. In addition, a display method of the background application may be implemented using various methods known in the art. Through a display operation of the execution view corresponding to the background application, the user may exactly recognize what is the background application corresponding to the number of touch points input by the user, and input a command for controlling execution of the background application.

Next, the controller 110 may determine whether a defined touch gesture for controlling execution of an application is detected in step 360. That is, if the number of touch points is detected based on the touch event input to the touch screen 130, the controller 110 may determine whether the touch gesture is detected based on the touch event. In this case, the touch gesture may refer to a command signal input by the user in order to control execution of one application among a plurality of applications. Various touch gestures and application execution commands may be previously mapped and stored.

Referring to step 360, when the defined touch gesture for controlling execution of an application is not detected at step 360, the controller 110 displays the execution view corresponding to the background application on a part or the whole of a view as a partially transparent window, which may be semi-transparent, and the controller 110 loops back to perform steps 350-360 to wait for input of the touch gesture by the user.

Otherwise, in step 360, if a defined touch gesture for controlling a corresponding application is detected, the controller 110 controls the detected or selection application according to the touch gesture in step 370. That is, the controller 110 may control execution of a corresponding application according to a touch gesture input by the user. In this case, an execution view of an application corresponding to a first layer which is executed in the foreground is displayed on the display panel 131. However, the application executed in the background is not viewed by the user but nevertheless may be controlled by the user. After step 370, the method of FIG. 3 then ends.

The foregoing exemplary embodiment of the present invention allows a user to confirm the execution view of a corresponding application according to the number of touch points input to the touch screen. In addition, the exemplary embodiment of the present invention may easily control execution of a plurality of applications executed in a background without being switched to a foreground, thereby improving convenience for the user.

Figure 4:
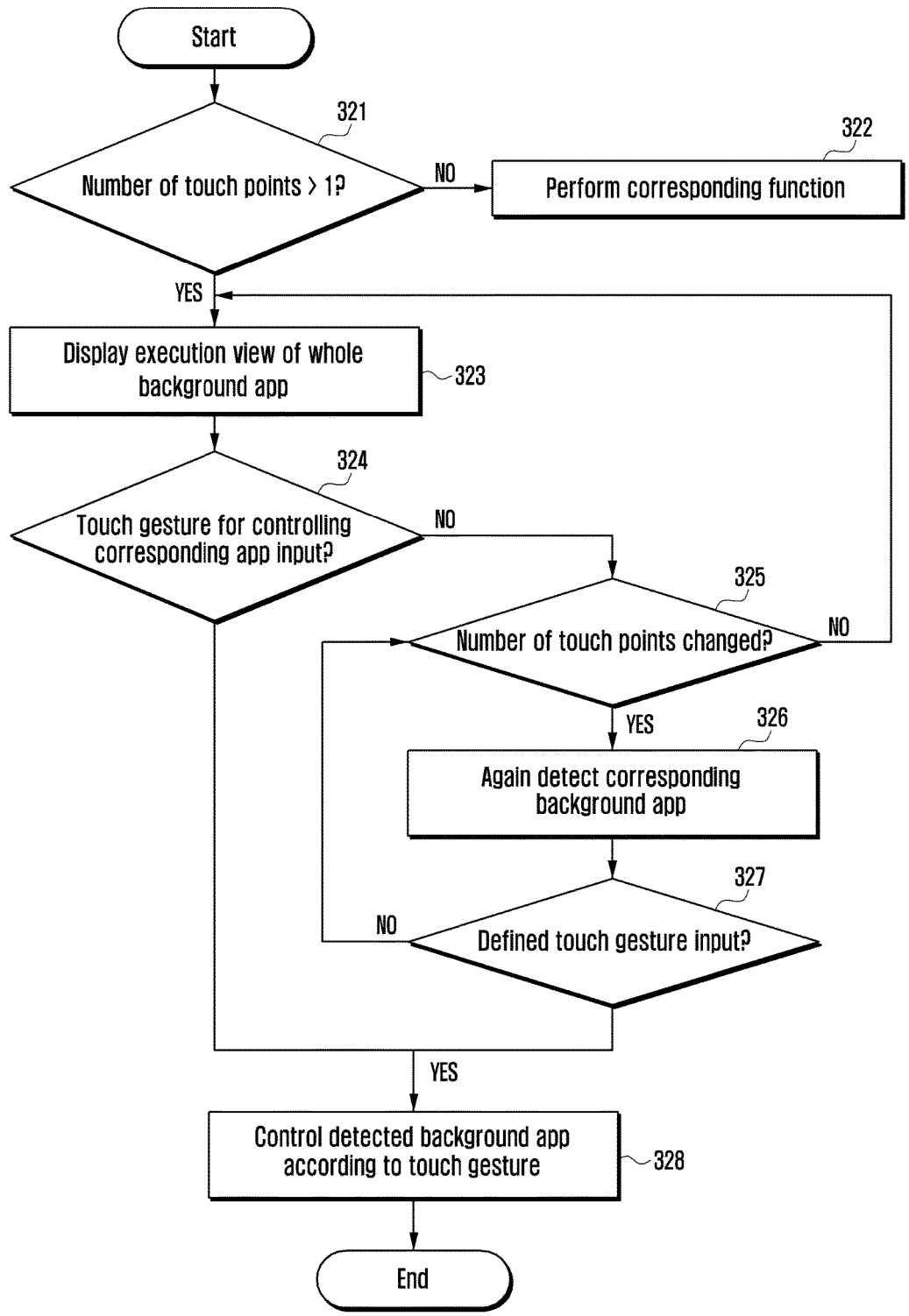
FIG. 4 is a flowchart illustrating a method of controlling execution of applications of the electronic device according to another alternative exemplary embodiment of the present invention.

FIG. 4 is a flowchart illustrating a method of controlling execution of applications of the electronic device according to another alternative exemplary embodiment of the present invention.

As shown in FIG. 4, the controller 110 determines whether the number of touch points exceeds one touch point in step 321. That is, the controller 110 may determine whether the number of touch points on a touch event input to the touch screen 130 is equal to or greater than two touch points to determine whether the touch event for controlling execution of a background application is input. If the number of the touch points is one touch point, the controller 110 may determine to select the foreground application and perform a corresponding function or other functions of the electronic device in step 322.

When the number of touch points exceeds one touch point, as detected in step 321, the controller 110 displays an execution view corresponding to the whole background application on the touch screen 130 in step 323. That is, the controller 110 may display the whole execution view of the application operated in a least one background on a part of an execution view of the foreground application. The background applications may be listed in the order in which the background applications are recently used by the user, and at least one of letters, numbers, characters, and symbols corresponding to the order may be displayed together.

The execution view of the background application displayed on the part of the view or viewable screen area of the display panel 131 may be displayed to overlap with the execution view of the foreground application as a partially transparent window, which may be semi-transparent. An execution view corresponding to the whole background application may be displayed on the touch screen 130 for a predetermined time and disappear or may be displayed with a flicker effect and disappear, but a display method of the execution view is not limited.

Next, the controller 110 determines whether a defined touch gesture for controlling a corresponding application is input in step 324. The corresponding application may be a background application driven at a layer previously mapped to the number of touch points. If a defined touch gesture for controlling the corresponding application is input as detected in step 324, the controller 110 controls the detected or selected background application or app according to the touch gesture in step 328, and the method of FIG. 4 then ends. However, in step 324, if no defined touch gesture for controlling the corresponding application is input as detected in step 324, the controller 110 determines whether the number of touch points is changed in step 325. That is, the controller 110 may determine whether the defined touch gesture for controlling the corresponding application is not input and the number of touch points is changed. If the number of the touch points is not changed and the defined touch gesture is not input, the controller 110 may loop back to step 323 to display the execution view corresponding to the whole background application on a part of the execution view where the background application is positioned, and the controller 110 may wait for an input of the touch gesture by the user.

Referring back to step 325, when the number of touch points is changed, the controller 110 again detects a corresponding background application in step 326. That is, the controller 110 may again detect an application corresponding to a layer mapped to the changed number of the touch points. For example, a first layer, that is, application executed in a foreground, is mapped to one touch point, and applications executed in the background from the second and more layers are mapped to at least two touch points in an ascending order. For example, the controller 110 may execute 'search web page', 'music player', and 'mail browser' as a plurality of applications in the electronic device. Among the executed applications, the search web page is executed in a foreground, and the music player and the mail browser may be executed in the background in the order of the music player and the mail browser.

When two touch points are detected at step 321, and three touch points are later detected at step 324, the controller 110 may detect a 'mail browser' application instead of the 'music player' application in steps 325-326. The controller 110 then determines whether the defined touch gesture is input in step 327. When the defined touch gesture is input as detected in step 327, the controller 110 controls a mail browser according to the touch gesture, that is, controls the detected background application according to the touch gesture in step 328, and the method of FIG. 4 ends. However, in step 327, if no defined touch gesture is input, the method loops back to step 325.

As described, the foregoing exemplary embodiment of the present invention with reference to FIG. 4 allows the user to simply confirm a plurality of background applications, and may freely and simply change selection of an application to be controlled from at least one background application, even though the user does not see the background application, but nevertheless can control a selected background application.

Figure 5:
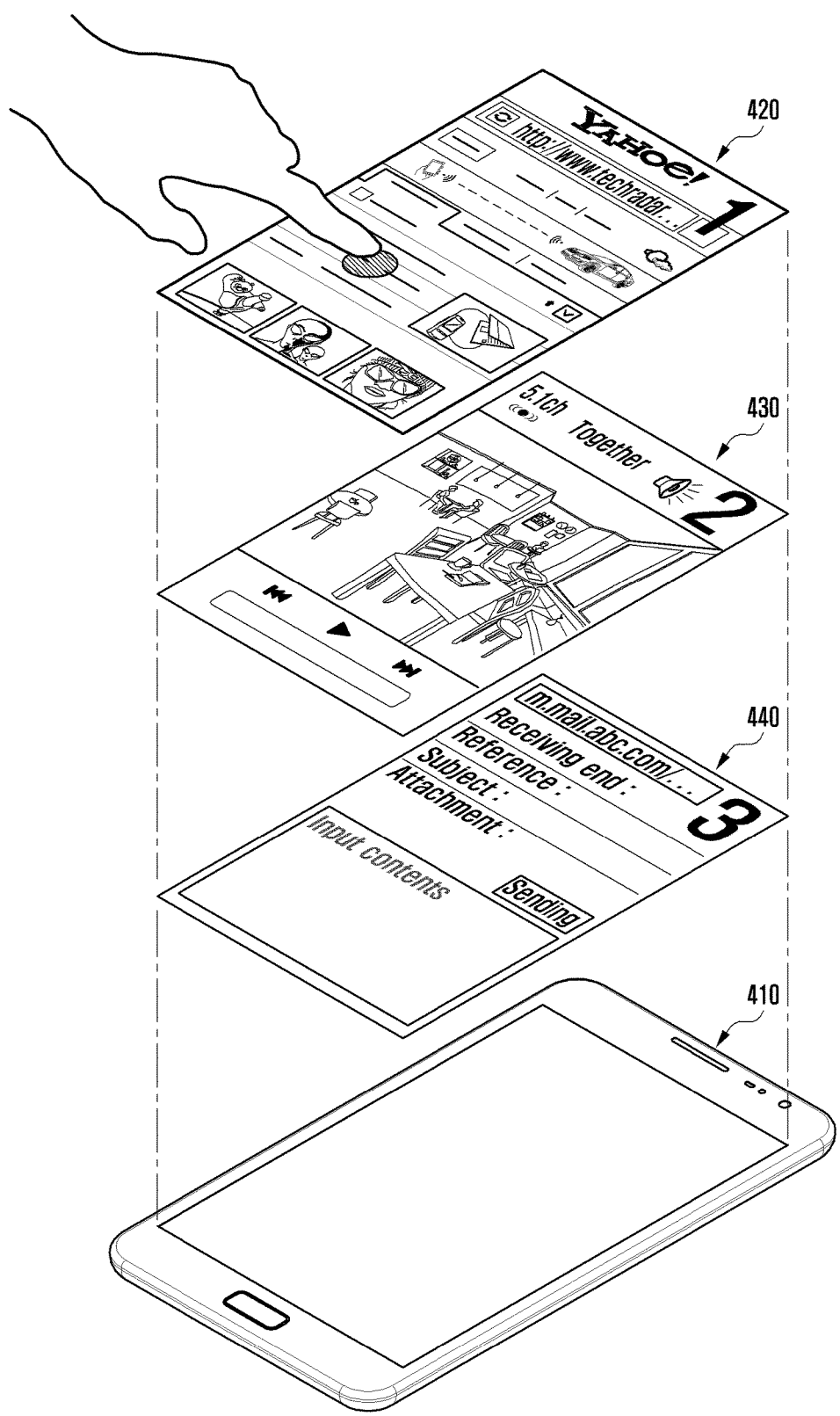

FIGS. 5 to 12 are diagrams illustrating a user interface for controlling a background application according to the exemplary embodiment of the present invention. FIG. 5 illustrates an execution view of a plurality of applications which are currently simultaneously executed, that is, multi-tasked, and displayed or displayable on a touch screen of the electronic device 410, and which are sequentially layered in an order in which the applications are recently used by the user. The latest used search web page 420 of a 'search web page' application may be set to a first layer, an execution view 430 of a next used application for a 'music player' may be set to a second layer, and an execution view 440 of a finally used application for a 'mail browser' may be set to a third layer.

As shown in FIG. 5, if a touch event, represented by the shaded circle at the end of the finger of the user, is generated on the execution view 420 of a foreground application by the user, the controller 110 determines the number of the touch points as one touch point, and may detect next input touch events as a touch event with respect to a search web page 420 executed on the first layer.

Figure 6:
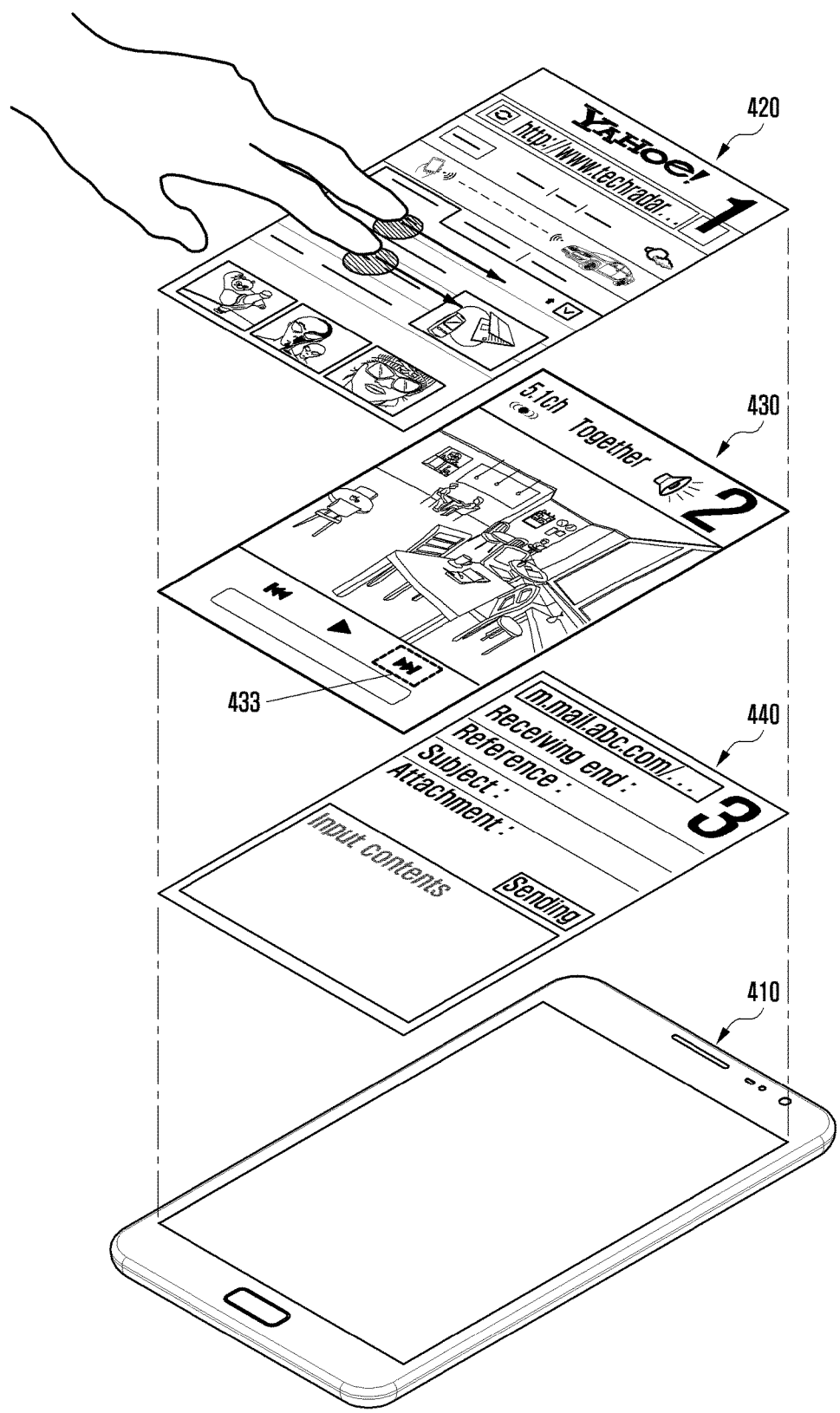

As shown in FIG. 6, if a touch event is generated on an execution view 420 of the foreground application through two fingers of the user, represented by the two shaded circles at the ends of the fingers of the user, the controller 110 detects the number of touch points as two touch points, and selects a music player driven on a corresponding second layer. If a touch gesture input from a left side to a right side of the touch panel 132 of the screen of the electronic device 410 is detected after the input of the touch event, represented by the rightward pair of arrows from the shaded circles on the execution view 420 in FIG. 6, the controller 110 detects the detected touch gesture as a touch gesture for controlling execution of the music player application, and controls execution of the music player according to the touch gesture. That is, the controller 110 may play a sound source corresponding to a next order in an order of a music list according to the touch gesture input from the left side to the right side; for example, to select a next track or music song which effectively corresponds to pressing the next track icon 433 on the execution view 430 of the 'music player' application, even though the execution view 430 is not displayed in the foreground and is not visible to the user.

Figure 7:
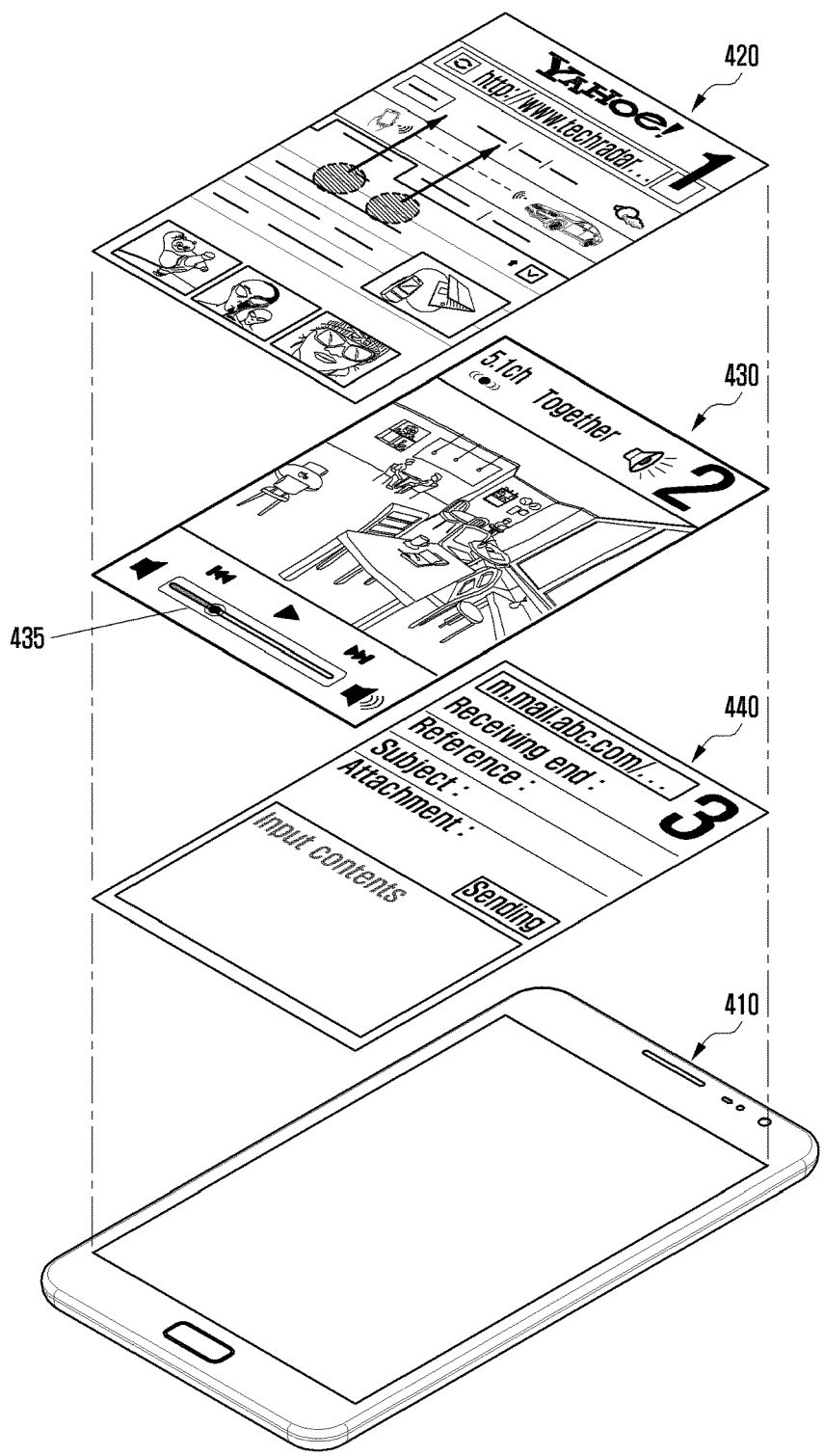

As shown in FIG. 7, the controller 110 detects an input of two touch points on an execution view 420 of the foreground application, represented by the pair of shaded circles on the execution view 420. Accordingly, if a music player application driven on the second layer is selected and a touch gesture input from a lower side to an upper side, represented by the upward arrows from the pair of shaded circles on the execution view 420, the controller 110 may increase a volume of a playback sound source of the music player, which effectively corresponds to using a volume magnitude interface 435 of the second layer execution view 430 to be adjusted by the touch gesture input on an execution view 420 of the foreground application so that volume magnitude can be adjusted. In this case, a music player application corresponding to the second layer execution view 430 may be driven in the background and may be controlled by a touch gesture input to an app execution view 420 driven in the foreground, even though the volume magnitude interface 435 is not displayed in the foreground and is not visible to the user.

If a touch gesture input from an upper side to a lower side of the execution view 420 is detected after input of two touch points is detected, represented by the pair of shaded circles on the execution view 420, the controller 110 may reduce a volume magnitude of a music player playback sound source, even though the volume magnitude interface 435 is not displayed in the foreground and is not visible to the user.

Figure 8:
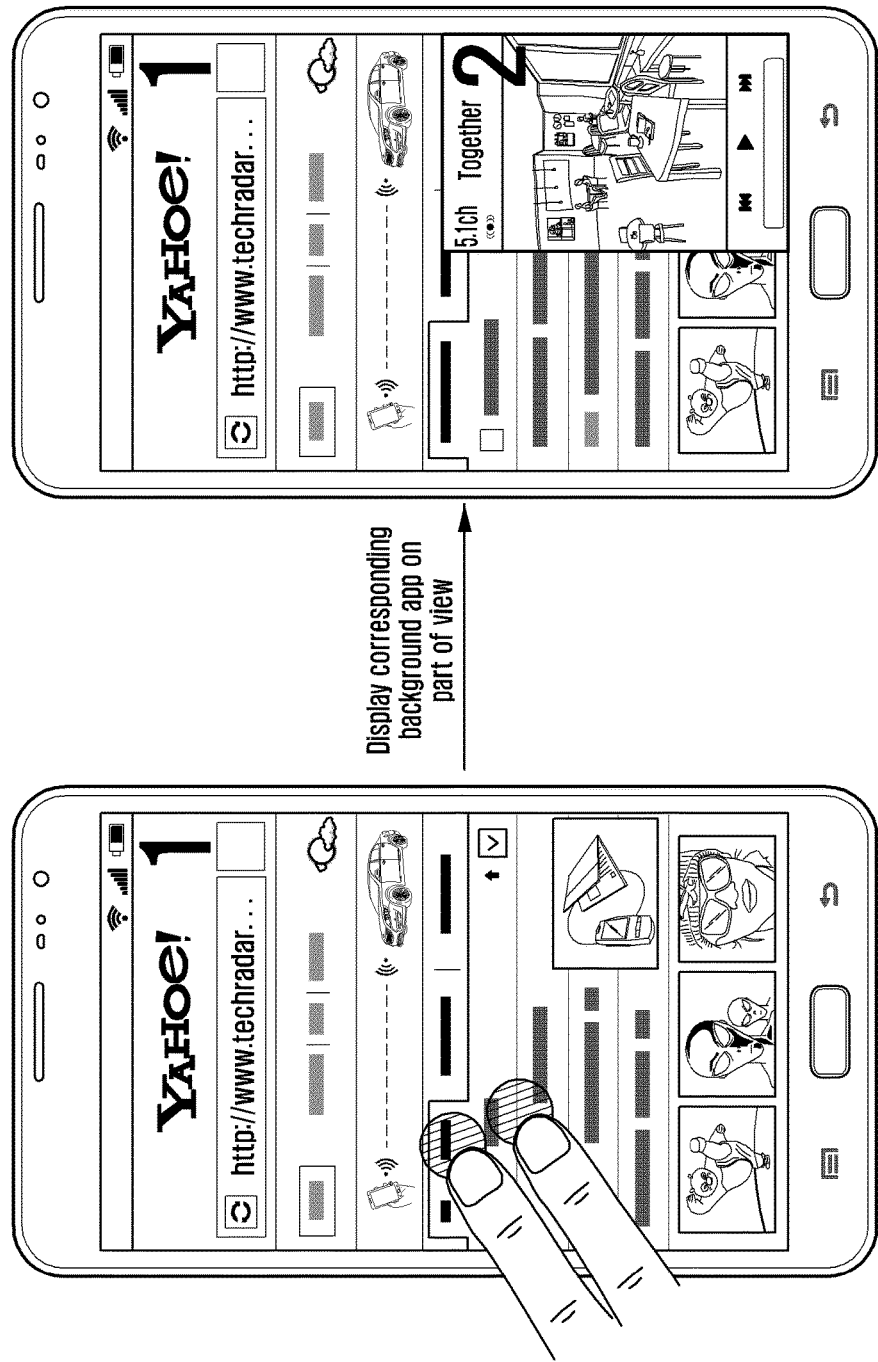
Figure 9:
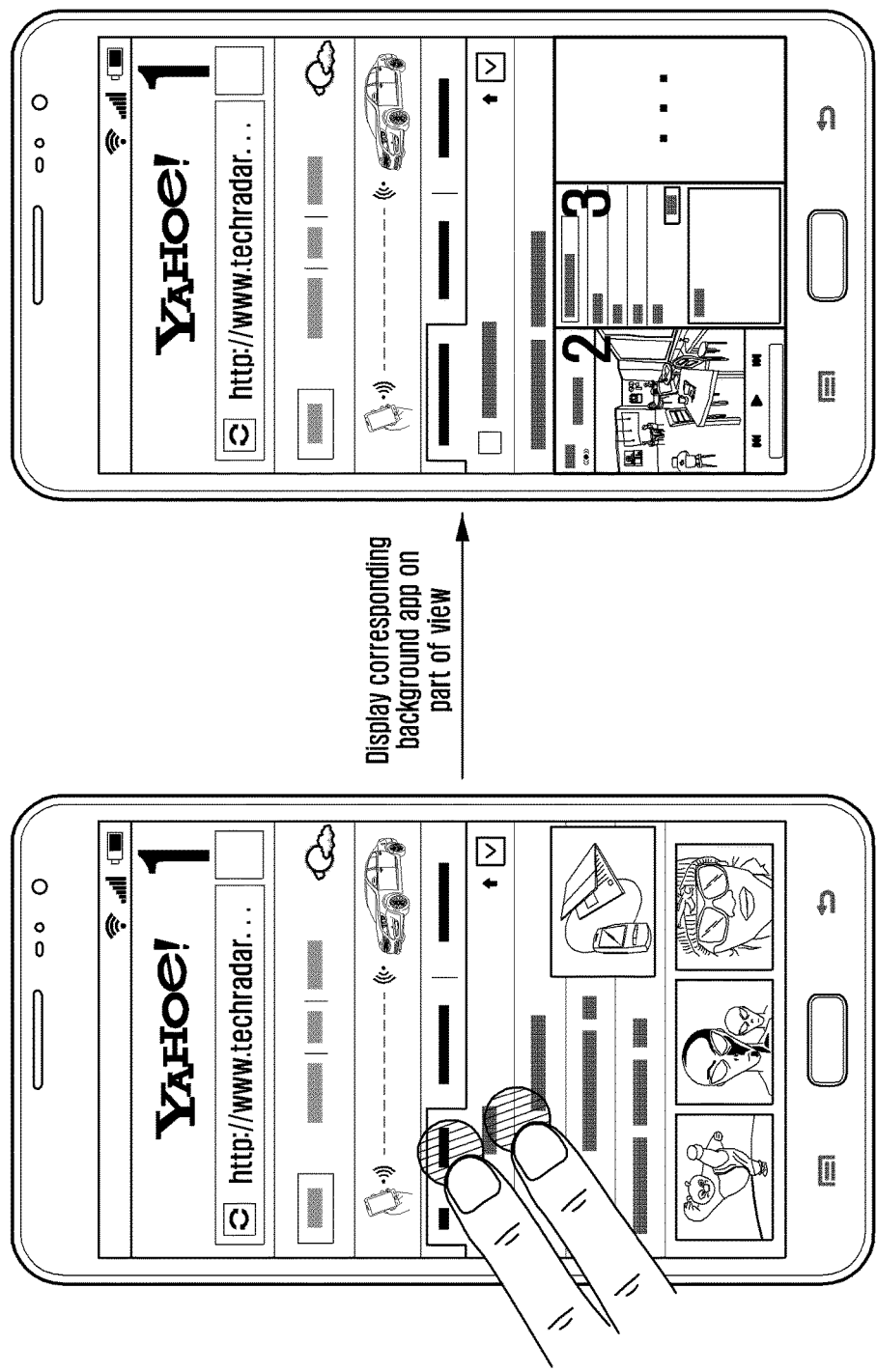
Figure 10:
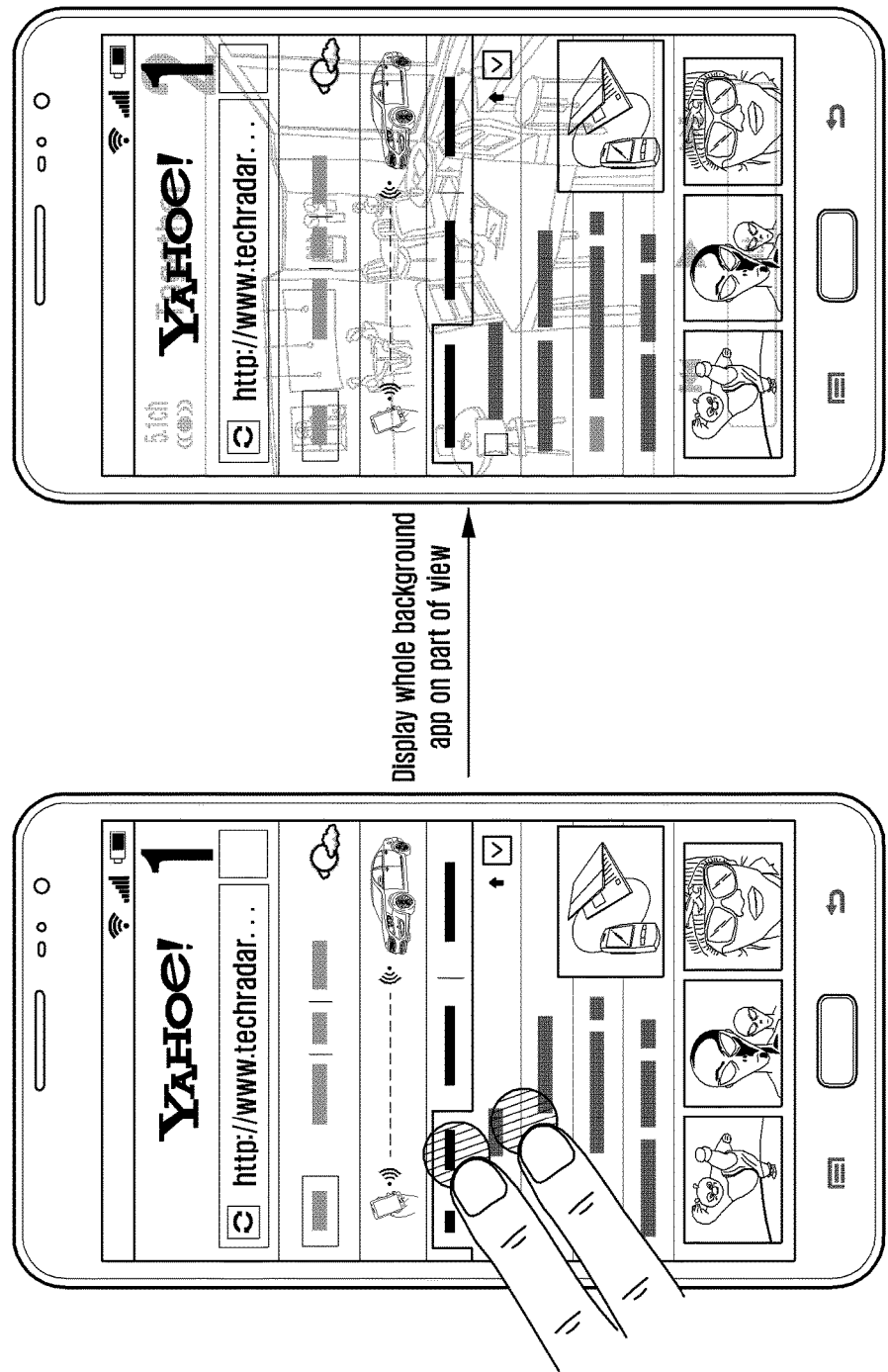

FIGS. 8 to 10 illustrate the exemplary embodiment for displaying an execution view of at least one background application according to the number of touch points input to the execution view 420 of the foreground application.

Referring to FIG. 8, the controller 110 may detect the number of touch points input to the execution view of the foreground application to display an execution view of a corresponding background application according to the detected number of touch points to overlap with a part of an execution view corresponding to an application driven on a current foreground.

For example, in response to the pair of touch points shown in the left screen in FIG. 8, represented by the pair of shaded circles at the ends of the fingers of the user, a sound source playback execution view of a music player application corresponding to two touch points is displayed at a part of a bottom end of the web page search execution view shown in the right screen of FIG. 8, with the indicator or label "1" displayed and corresponding to the foreground application, that is, the web page search execution view for the web page search application, and with the indicator or label "2" displayed and corresponding to the background application, that is, the music player execution view for the music player application. Such a display of the execution views is performed by step 350 of FIG. 3. In this case, the sound source playback execution view of the music player may be displayed on at least one of an upper portion, a lower portion, and a central portion of the search web page view as an execution view of a background application, and a display location and size of the sound source playback execution view may be previously set by a designer or manufacturer of the electronic device, or by the user. The display method of the various execution views of the present invention is not limited to the example shown in FIG. 8.

As shown in FIG. 9, if more than two touch points are detected on the left screen in FIG. 9, more than two partial execution views are displayed at a part of a bottom end of the web page search execution view shown in the right screen of FIG. 9, with the indicator or label "1" displayed and corresponding to the foreground application, and with the indicators or labels "2", "3", etc. displayed and corresponding to each respective background application. The display method of the various execution views of the present invention is not limited to the example shown in FIG. 9.

As shown in FIG. 10, for example, in response to the pair of touch points shown in the left screen in FIG. 10, represented by the pair of shaded circles at the ends of the fingers of the user, the execution view of the music player may be displayed to overlap with the whole search web page view with partial transparency, which may be semi-transparency or a preset transparency, as shown in the right screen in FIG. 10, with features of the execution view of the second layer for the music player application being partially transparent, as represented by the gray lines and features as well as the gray indicator "2" in the right screen of FIG. 10, which are combined and displayed with the solid lines and solid indicator "1" for the foreground search web page view. The sound source execution view of the music player, having the displayed or labeled indicator "2", may be displayed for a predetermined time on a web page search execution view, having the displayed or labeled indicator "1", and then disappear, and may be displayed while being flickered.

Referring to FIG. 10, when the number of touch points is two or more, the controller 110 may display an execution view corresponding to the whole background application on a part of the foreground application execution view, labeled "1". That is, the controller 110 may display the whole application execution view operated in at least one background on a part of an execution view of the foregoing application. The background applications may be listed in the order which are recently used by the user, and at least one of numbers, characters, and symbols corresponding to the order may be displayed together, such as the displayed indicators "2", "3", etc., shown in the right screen of FIG. 9. The order may also be based on an aggregated number of uses over a predetermined time period. The execution view of the background application displayed on the part of the view may be displayed to overlap with the execution view of the foreground application as a partially transparent window, which may be semi-transparent. An execution view corresponding to the whole background application may be displayed on the web page search execution view, labeled "1", for a predetermined time and disappear or may be displayed with a flicker effect and disappear. The display method of the various execution views of the present invention is not limited to the example shown in FIG. 9.

Figure 11:
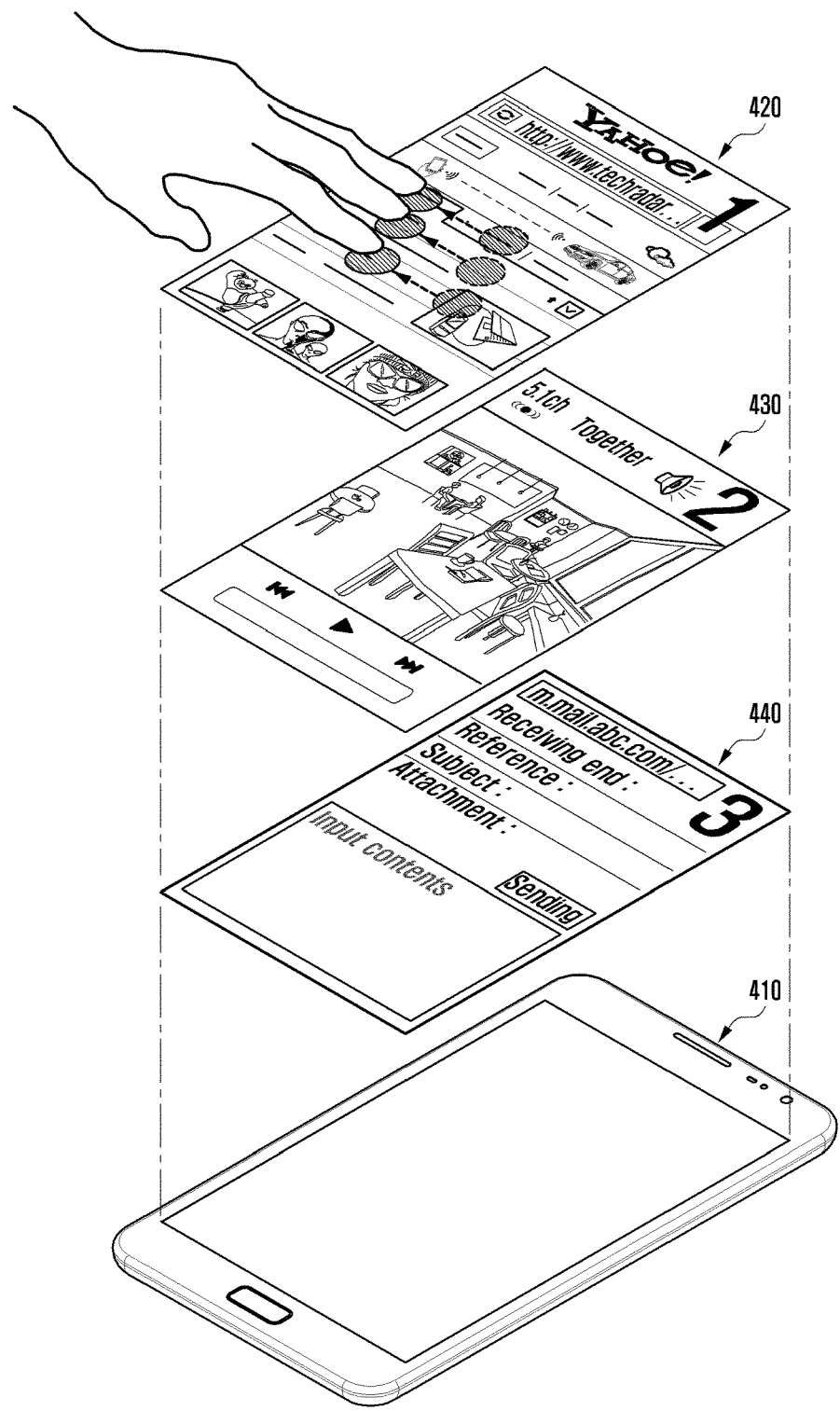
Figure 12:
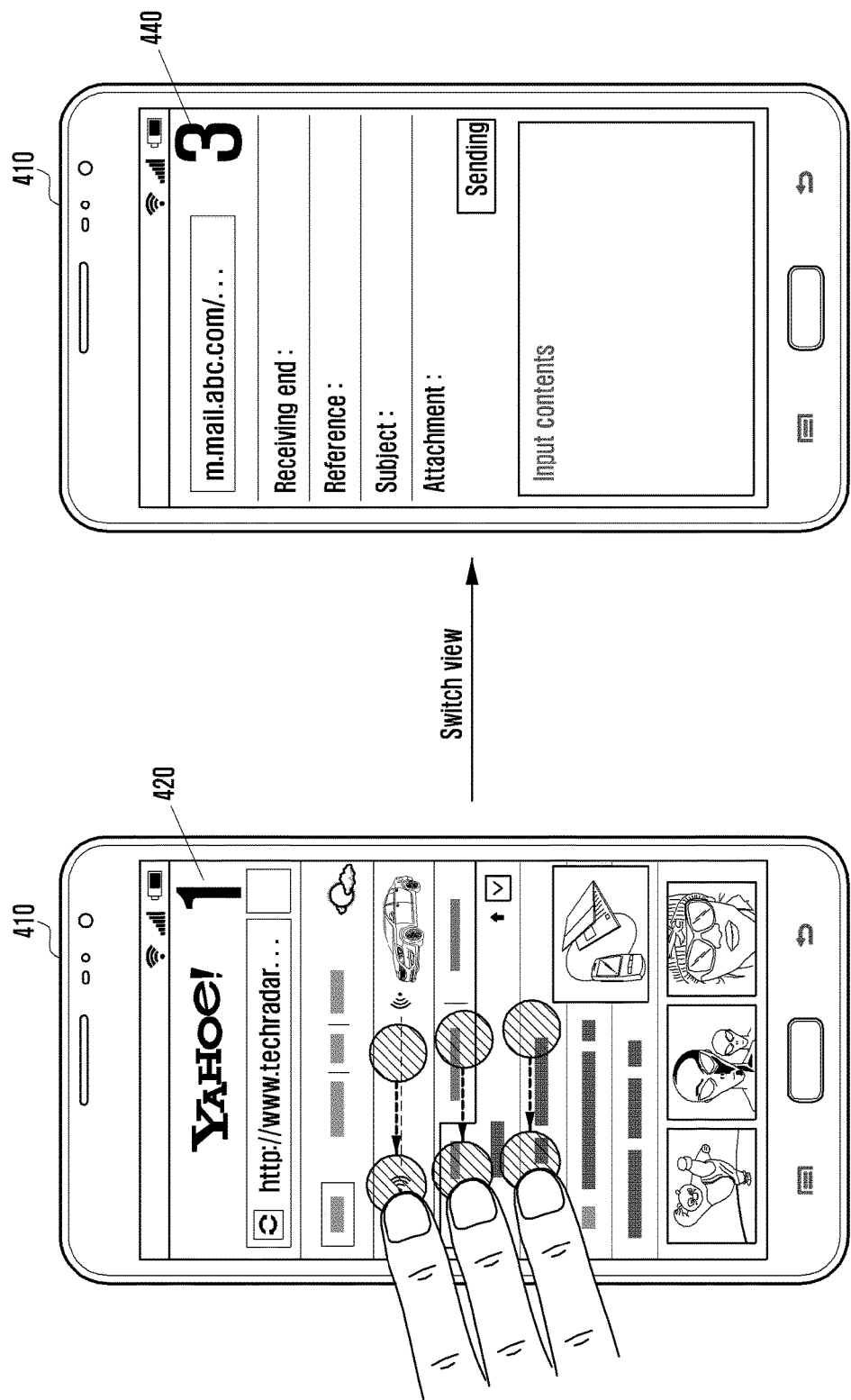

Referring to FIGS. 11 and 12, in an alternative exemplary embodiment, the controller 110 may fully switch a background application to the foreground application according to a touch gesture input to the execution view of the foreground application. For example, when a tapping is generated on the execution view 420 of the foreground application within a preset time by three fingers, represented by the three shaded circles and movement of the fingers from an initial touch position to a final touch position, represented by the leftward arrows from three initial shaded circles to three finally-positioned shaded circles in FIG. 11, the controller 110 may determine the generated tapping to be a command to drive an execution view 440 of the background application corresponding to a third background to be switched to be displayed on the foreground. Accordingly, as shown in FIG. 12, the controller 110 may hide a web page search execution view 420 driven in the foreground, and may display an execution view 440 of a mail browser on the touch screen in the foreground of the electronic device 410. That is, the controller 110 may switch execution of an application driven in the background according to the touch gesture to the foreground.

While the electronic devices in the prior art perform inputting of a home key and a cancel key several times in order to switch an application executed in a background to a foreground, the present invention may simply control the background application and/or switch the foreground and background applications by only an input of a preset touch gesture.

Meanwhile, the foregoing exemplary embodiment of the present invention has illustrated the method of controlling execution of the background application with reference to FIGS. 5 to 12. However, the present invention is not limited thereto. For example, it will be readily apparent to those skilled in the art that the present invention is applicable to a gallery providing a User Interface (UI) for controlling a background application, an electronic book, an address book information display view, and a music playback view.

The method of controlling execution of the background application according to the exemplary embodiment of the present invention as described above may be implemented in an executable program command form by various computer devices and be recorded in a non-transitory computer readable recording medium. In this case, the non-transitory computer readable recording medium may include a program command, a data file, and a data structure individually or a combination thereof. In the meantime, the program command recorded in the non-transitory recording medium may be specially designed or implemented for the present invention, or may be known to a person having ordinary skill in a computer software field to be used. The non-transitory computer readable recording medium includes Magnetic Media such as a hard disk, a floppy disk, or a magnetic tape, an Optical Media such as Compact Disc Read Only Memory (CD-ROM) or a Digital Versatile Disc (DVD), a Magneto-Optical Media such as a floptical disk, and a hardware device such as a ROM, a RAM, and a flash memory storing and executing program commands. Further, the program command includes a machine language code created by a complier and a high-level language code executable by a computer using an interpreter. The foregoing hardware device may be configured to operate at least one software module to perform an operation of the present invention.

The above-described apparatus and methods according to the present invention can be implemented in hardware or firmware, or as software or computer code, or combinations thereof. Various components such as a controller, a central processing unit (CPU), a processor, and any unit or device described herein includes at least hardware and/or other physical structures and elements. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

As described above, the electronic device and a method of controlling applications according to the exemplary embodiment of the present invention can simply control the applications executed in the background without switching the applications, and allow the user to intuitively confirm a background application by showing the background application execution view in a foreground application execution view. Accordingly, the present invention can improve convenience for the user.

Although exemplary embodiments of the present invention have been described in detail hereinabove, it should be clearly understood that many variations and modifications of the basic inventive features herein taught which may appear to those skilled in the present art will still fall within the spirit and scope of the present invention, as defined in the appended claims.

What is claimed is:

1. A method performed by at least one processor of an electronic device having a touch screen, of controlling applications in the electronic device, the method comprising:
executing a first application displayed on the touch screen, and executing one or more background applications undisplayed on the touch screen;
associating the first application with a first layer and the one or more background applications with one or more secondary layers, respectively;

mapping each of the one or more secondary layers to each of a different number of touch contacts to the touch screen, respectively;

detecting a multi-touch input to the first application;

selecting an application to control responsive to the detected multi-touch input from among the one or more undisplayed background applications based on the mapping and a number of touch points included in the multi-touch input that contact the touch screen; and when the application of the one or more background applications is selected based on the number of touch points, controlling at least one operation of the selected background application according to a detected touch gesture.

2. The method of claim 1, wherein the detecting the number of touch points comprises detecting a number of simultaneous inputs to the touch screen within a preset time, and wherein at least one operation of the selected background application is executed responsive to the detected touch gesture without displaying the selected background application and maintaining display of the first application on the touch screen.

3. The method of claim 1, wherein the detecting of the touch gesture comprises detecting one touch gesture from a plurality of touch gestures previously mapped to a plurality of execution control commands associated with the selected background application.

4. The method of claim 1, wherein the selected background application is an audio player application, and controlling an operation of the selected background application according to the detected touch gesture comprises one of controlling volume and changing a content selection.

5. The method of claim 1, wherein the multi-touch input includes a sequence of tap inputs to the touch screen, and the number of touch contacts indicates a count of a number of the taps.

6. A method performed by at least one processor of an electronic device having a touch screen, comprising:

executing applications and arranging the executed applications in layers disposed in an order in which the applications are executed;

displaying a first application on the touch screen of the executed applications while maintaining execution of remaining applications undisplayed on the touch screen;

mapping each layer to each of a different number of touch contacts to the touch screen, respectively;

in response to detecting a multi-touch input to the displayed first application, selecting a particular application from among the remaining undisplayed applications based on the mapping and a number of touch points included in the detected multi-touch input that contact the touch screen;

when the selected particular application is one of the remaining undisplayed applications, removing the first application from display and displaying the selected particular application on the touch screen; and controlling the selected particular application according to a subsequently detected touch gesture.

7. The method of claim 6, wherein the displaying the selected particular application comprises displaying an execution screen of the selected particular application on a portion of the touch screen.

8. The method of claim 6, further comprising:

detecting a change in the number of the touch points input to an execution view of the selected particular application displayed on the touch screen; and selecting another application of the executed applications based on the changed number of the touch points after the displaying of the execution view of the selected particular application.

9. The method of claim 6, wherein the displaying of the selected particular application further comprises displaying at least one of letters, numbers, characters, and symbols identifying a particular layer of the selected particular application with the order over an execution view of the selected particular application.

10. An electronic device configured to perform the method of claim 6.

11. A method in an electronic device having a touch screen, the method being performed by at least one processor of the electronic device and comprising:

executing applications and arranging the executed applications in layers disposed in an order in which the applications are executed, such that a latest executed application is disposed in an uppermost layer;

displaying the latest executed application on the touch screen while maintaining execution of other applications as background applications undisplayed on the touch screen;

mapping each layer to each of a different number of touch contacts to the touch screen, respectively;

in response to detecting a multi-touch input to the displayed latest executed application, selecting a particular background application for display based on the mapping and a number of touch points included in the multi-touch input that contact the touch screen;

displaying at least one thumbnail representing an execution screen of the selected-a particular background application; and after detecting a touch input selecting the least one thumbnail, detecting a touch gesture for controlling the particular background application corresponding to the selected at least one thumbnail and controlling the particular background application according to the detected touch gesture.

12. The method of claim 11, further comprising:

detecting a change in the number of the touch inputs; and selecting a new background application according to the changed number of the touch inputs, after displaying of the at least one thumbnail.

13. The method of claim 11, wherein the displaying the at least one thumbnail comprises at least one of:

displaying the at least one thumbnail in the order in which the applications are executed; and displaying at least one of a letter, a character, a number, and a symbol over each of the at least one thumbnail indicating a respective corresponding layer among the layers.

14. An electronic device configured to perform the method of claim 11.

15. The method of claim 11, wherein the displaying the at least one thumbnail comprises displaying one or more thumbnails according to the order in which the applications are executed.

16. The method of claim 11, wherein the displaying the at least one thumbnails comprises displaying at least one of a letter, a character, a number, and a symbol indicating a corresponding layer of the layers for each thumbnail.

17. The method of claim 11, wherein displaying the at least one thumbnail disposed with the displayed latest executed application comprises displaying the at least one thumbnail overlapping display of the latest executed application.

18. An electronic device, comprising:
a touch panel operatively coupled to a display;
a controller operatively coupled to the touch panel, configured to;
execute applications and arrange the executed applications in layers disposed in an order in which the applications are executed;
controlling the touch panel to display a first application of the executed applications disposed in a topmost layer, while maintaining undisplayed execution of other applications as background applications on remaining layers different than the topmost layer;
mapping each of the layers to each of a different number of touch contacts to the touch panel, respectively;
in response to detecting a multi-touch input to the displayed first application, selecting a particular background application from among the background applications based on the mapping and a number of touch points included in the detected multi-touch input that contact the touch panel; and
controlling an operation of the selected particular background application according to a subsequently detected touch gesture.

19. The electronic device of claim 18, wherein the controller detects the number of points of a touch event simultaneously input on the touch panel within a preset time.

20. The electronic device of claim 18, wherein the selected background application is an audio player application, and the multi-touch input directly controls one of volume and changing a content selection of the audio player application.

21. The electronic device of claim 18, wherein the multi-touch input includes a sequence of tap inputs to the touch panel, and the number of touch contacts indicates a count of a number of the taps.

* * * * *

UNITED STATES PATENT AND TRADEMARK OFFICE
CERTIFICATE OF CORRECTION

PATENT NO. : 10,152,216 B2
APPLICATION NO. : 14/287808
DATED : December 11, 2018
INVENTOR(S) : Jaehoon Kim Page 1 of 1

It is certified that error appears in the above-identified patent and that said Letters Patent is hereby corrected as shown below:

In the Claims

Column 20, Claim 11, Line 36 should read as follows:
--...screen of the selected particular background...--

Column 20, Claim 12, Line 47-48 should read as follows:
--...touch inputs, after displaying the at least one thumbnail.--

Signed and Sealed this
Twenty-sixth Day of February, 2019

Andrei Iancu
*Director of the United States Patent and Trademark Office*